April 18, 1939. J. R. KVITSKY 2,154,756
FISHING LURE
Filed Feb. 9, 1938

INVENTOR.
Joseph R. Kvitsky.
BY
Walter C. Ross.
ATTORNEY.

Patented Apr. 18, 1939

2,154,756

UNITED STATES PATENT OFFICE 2,154,756

FISHING LURE

Joseph R. Kvitsky, Westfield, Mass.

Application February 9, 1938, Serial No. 189,605

4 Claims. (Cl. 43—48)

This invention relates to improvements in fishing lures and is directed more particularly to the provision of a lure of the so-called "spinner" type and a novel method of making the same.

It is one of the principal objects of the invention to provide a fishing lure which has a more natural bug-like appearance as it travels through the water than lures heretofore known. In general the lure includes a body part and a hook and has associated with its forward end a spinner or rotatable propeller which is so arranged as to bring about a shimmying movement of the lure.

Still another object of the invention is the provision of a novel method of making lures which is easier and less expensive than methods now in practice. As will appear, the lures made in accordance with this method are distinctive in construction and have a life-like appearance.

Various other objects of the invention will become more apparent after a reading of the following description and reference will be had to the accompanying drawing, wherein.

Figure 1:
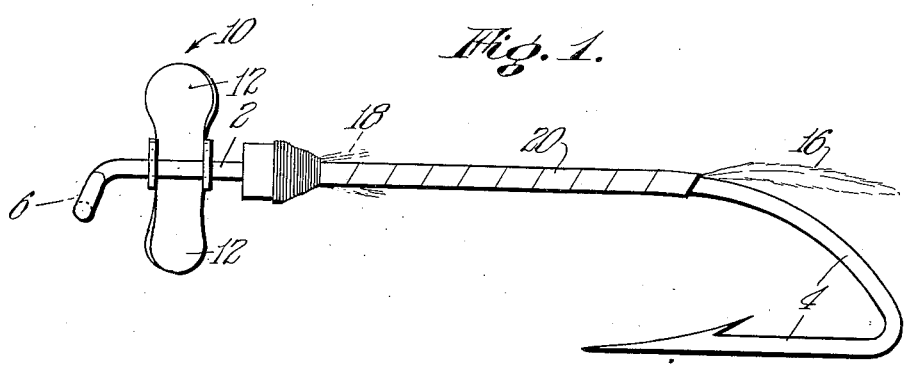
Fig. 1 is a plan view of the lure of the invention.

Referring now to the drawing more in detail the invention will be fully described.

In Fig. 1, there is shown a support member which includes a longitudinal shank 2 having a hook 4 at one end thereof and a line-connecting means 6 at the other end thereof. It will be obvious that the lure may vary in shape and size so that the parts 2, 4 and 6 may differ widely from the form shown.

A spinner or propeller-like member 10 is rotatably disposed on the shank 2 adjacent the forward end thereof. According to the preferred form of the invention, the member consists of a stamped piece of metal bent and shaped to have a pair of oppositely disposed propeller blades 12 with a pair of spaced journal or bearing lugs 14 therebetween.

The lugs 14 are provided with openings to receive the shank 2 and the means 6 may be so formed as to prevent the spinner's falling off the forward end of the lure. The bearing for the inner lug 14 will later be described.

A propeller of more or less usual form would, of course, rotate when the lure or "bug" goes through the water. It is common to form the spinner of shiny metal so that the revolving member readily attracts the eye of the fish.

I have found, however, that more desirable results may be had if the lure is caused to waver or shimmy somewhat as it goes through the water. To this end I unbalance the spinner so that as it rotates it causes the whole lure to travel with a wavy motion as contrasted with the straight-line movement of the lures now in common use.

This unbalancing of the spinner may be brought about in many ways and I do not desire to be limited to any specific embodiment.

In one way the metal may be bent so that the plane of one blade 12 is at a different angle relative to the axis of rotation of the spinner than the other blade. This is as shown in Fig. 3 and it will be seen that as the propeller rotates and the lure moves the shank is caused to waver or shimmy giving to the lure the life-like appearance of a bug going through the water.

Figure 3:
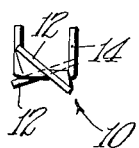
Fig. 3 is an end elevational view of the preferred form of spinner or propeller.
Figure 4:
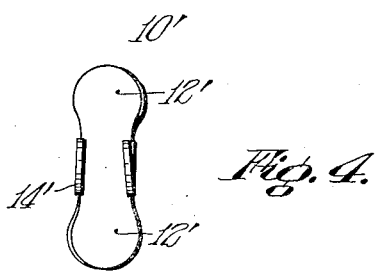
Fig. 4 is a plan view showing a modified form of spinner.

As a modification of the form shown in Fig. 3, I have shown in Fig. 4 a propeller 10' having blades 12' and lugs 14'. In this form the innermost lug 14' is twisted slightly as shown and this is adapted to abut and cooperate with a flat bearing surface, later to be described. The angularly-disposed or offset lug 14' in contact with the flat bearing causes the desired shimmy as the spinner rotates.

It is usual to build up a life-like bug body on the support by attaching a feather or feathers to the shank. The bodies, of course, take various forms but for purposes of description a single feather 16 is shown extending rearwardly from the shank and others 18 are shown attached adjacent the forward end of the support. According to the preferred form of the invention, I secure these feathers in place by means of a winding or windings and my winding consists of a strip of relatively thin flat material 20 which can vary in width and thickness. I have found that if what is commonly known as tinsel is wound around the shank and over portions of the feathers it not only provides a satisfactory means of building up the bug-body but it may be nicely rolled upon itself at the forward end of the shank to form a good bearing for the propeller as shown more clearly in Fig. 2.

That is to say, the strip 20 may be rolled up so that its forward edges are in exact alignment and thereby form a bearing surface 22 which is absolutely flat. Such a surface is desirable, I have found, as it facilitates more efficient and speedier rotation of the spinner than is the case with the rounded bearing-surfaces heretofore in use.

Figure 2:
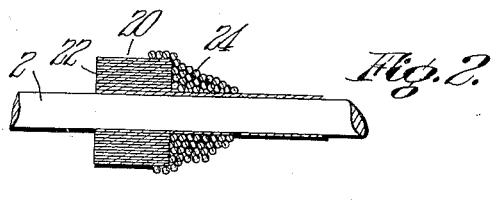
Fig. 2 is a partial sectional view through the lure shown in Fig. 1.

It will be appreciated that I thus utilize the winding which secures the feathers to the shank to build up a novel and more useful bearing surface. While the tinsel may be secured in place in various ways, I preferably tie a thread 24 around the covered shank as shown in Fig. 2. Or in another way, lacquer, shellac, or some other adhesive-like substance may be applied to the outside of the winding.

While a flat bearing surface may be formed in other ways so as to cooperate with either the unbalanced spinner shown in Fig. 3 or that shown in Fig. 4, the method of this invention makes it possible to build up a better bearing surface at the same time as the body is built up. Furthermore, the surface 22 which I have described does, I find, more readily and efficiently lend itself to cooperation with the unbalanced spinner.

As stated above, in some cases it is desired to form the spinner of shiny metal for its attracting characteristics. In other cases, however, it may not be desired to have an attracting propeller.

That is to say, some fish are frightened rather than lured by a shiny object or, as in some States, it may be illegal to have attractors on lures. It will still be desired, of course, to have a spinner in order to attain the shimmy motion above referred to.

According to a modification of the invention, therefore, the spinner may be formed of some transparent material such as Celluloid. Such material readily lends itself to cutting and shaping into a blade of the proper unbalanced construction and, as will be obvious, while its rotative movements will bring about the desired wavy motion, it will not have the attracting qualities of the metal propeller.

While I have described the invention in great detail and with respect to a preferred form thereof, it is not desired to be limited thereto since many changes and modifications may be made therein without departing from the spirit and scope of the invention. What it is desired to claim and secure by Letters Patent of the United States is:

1. As a new article of manufacture, a fish lure of the class described comprising in combination, a support member including a shank and a hook at the rear end of the shank, a bearing part formed on said shank adjacent its forward end by a plurality of windings, and a spinner rotatable on said shank forwardly of said bearing part, said spinner including a pair of spaced bearing lugs which receive the shank and a pair of blades at opposite ends of the lugs, one of said lugs being angularly disposed with respect to the other.

2. As a new article of manufacture, a fish lure of the class described comprising in combination, a support member including a shank and a hook at the rear end of the shank, a body-forming part secured to said support member by a winding, said winding forming a bearing part on said shank adjacent its forward end, and a spinner rotatable on said shank forwardly of said bearing part, said winding consisting of a strip of flat sheet material.

3. As a new article of manufacture, a fish lure of the class described comprising, a support member including a hook part on its rear end and line-connecting means on its forward end and an intermediate shank part, a strip of flat sheet material having a substantially straight side edge wound upon itself concentrically of said shank part with said straight edge of the windings adjacent the forward end of the shank part and disposed in a common plane so as to provide a flat bearing surface disposed transversely of the axis of the shank part, said bearing surface being disposed inwardly of said line-connecting means, and a spinner rotatable on said shank part between said bearing surface and said line-connecting means.

4. As a new article of manufacture, a fish lure of the class described comprising, a support member including a hook part on its rear end and line-connecting means on its forward end and an intermediate shank part, a body member secured to said shank part inwardly of its forward end, a strip of flat sheet material wound concentrically of said shank part with inner windings thereof overlapping at least a part of said body member and outer windings thereof built up on one another to provide a bearing part between said line-connecting means and said body, and a spinner rotatable on said shank part between said bearing part and said line-connecting means.

JOSEPH R. KVITSKY.